US009718045B2

(12) United States Patent
Tour et al.

(10) Patent No.: US 9,718,045 B2
(45) Date of Patent: Aug. 1, 2017

(54) COMPOSITES FOR CARBON DIOXIDE CAPTURE

(71) Applicant: WILLIAM MARSH RICE UNIVERSITY, Houston, TX (US)

(72) Inventors: James M. Tour, Bellaire, TX (US); Chih-Chau Hwang, Houston, TX (US)

(73) Assignee: WILLIAM MARCH RICE UNIVERSITY, Houston, TX (US)

(*) Notice: Subject to any disclaimer, the term of this patent is extended or adjusted under 35 U.S.C. 154(b) by 319 days.

(21) Appl. No.: 14/371,791

(22) PCT Filed: Jan. 11, 2013

(86) PCT No.: PCT/US2013/021239
§ 371 (c)(1),
(2) Date: Jul. 11, 2014

(87) PCT Pub. No.: WO2013/106712
PCT Pub. Date: Jul. 18, 2013

(65) Prior Publication Data
US 2015/0056116 A1 Feb. 26, 2015

Related U.S. Application Data

(60) Provisional application No. 61/585,510, filed on Jan. 11, 2012.

(51) Int. Cl.
*B01D 53/62* (2006.01)
*B01J 20/32* (2006.01)
*B01D 53/02* (2006.01)
*B01J 20/06* (2006.01)
*B01J 20/20* (2006.01)
*B01J 20/28* (2006.01)
*B01J 20/34* (2006.01)
*C10L 3/10* (2006.01)

(52) U.S. Cl.
CPC ......... *B01J 20/3293* (2013.01); *B01D 53/02* (2013.01); *B01D 53/62* (2013.01); *B01J 20/06* (2013.01); *B01J 20/20* (2013.01); *B01J 20/2808* (2013.01); *B01J 20/28066* (2013.01); *B01J 20/28078* (2013.01); *B01J 20/28083* (2013.01); *B01J 20/28085* (2013.01); *B01J 20/3204* (2013.01); *B01J 20/3236* (2013.01); *B01J 20/3248* (2013.01); *B01J 20/3433* (2013.01); *B01J 20/3491* (2013.01); *C10L 3/104* (2013.01); *B01D 2251/00* (2013.01); *B01D 2253/102* (2013.01); *B01D 2253/1124* (2013.01); *B01D 2253/25* (2013.01); *B01D 2257/504* (2013.01); *B01D 2258/0283* (2013.01); *C10L 2290/541* (2013.01); *Y02C 10/04* (2013.01); *Y02C 10/06* (2013.01); *Y02C 10/08* (2013.01); *Y02C 20/20* (2013.01)

(58) Field of Classification Search
CPC ....................................................... B01D 53/62
See application file for complete search history.

(56) References Cited

U.S. PATENT DOCUMENTS

| 4,082,694 | A | 4/1978 | Wennerberg et al. |
|---|---|---|---|
| 4,504,287 | A | 3/1985 | Atlani et al. |
| 5,972,834 | A | 10/1999 | Ohsaki et al. |
| 6,547,854 | B1 | 4/2003 | Gray et al. |
| 6,585,948 | B1 | 7/2003 | Ryoo et al. |
| 6,592,764 | B1 | 7/2003 | Stucky et al. |
| 6,908,497 | B1 | 6/2005 | Sirwardane |
| 8,114,372 | B2 | 2/2012 | Pak et al. |
| 8,133,305 | B2 | 3/2012 | Lackner et al. |
| 8,277,767 | B2 | 10/2012 | Ariya-Far |
| 8,496,734 | B2 * | 7/2013 | Gadkaree ............... B01D 53/02 502/400 |
| 8,636,830 | B2 | 1/2014 | Barron et al. |
| 9,034,085 | B2 | 5/2015 | Barron et al. |
| 2003/0221555 | A1 | 12/2003 | Golden et al. |
| 2004/0045434 | A1 | 3/2004 | Golden et al. |

(Continued)

FOREIGN PATENT DOCUMENTS

| WO | WO-2012/026755 A2 | 3/2012 |
|---|---|---|
| WO | WO-2012/158194 A1 | 11/2012 |

OTHER PUBLICATIONS

Zhang et al., Enhancement of CO2 adsorption on high surface area activated carbon modified by N2, H2, and ammonia,Chemical Engineering Journal, 160 (2010), 571-577.
International Search Report and Written Opinion for PCT/US2013/021239, Mailed on Mar. 22, 2013.
Mishra et al, "Nanomagnetite decorated multiwalled carbon nanotubes: a robust nanomaterial for enhanced carbon dioxide adsorption" Energy and Environmental Sciences, 2011, 4, 889-895.
Huwe, "Iron (III) oxide nanoparticles within the pore system of mesoporous carbon CMK-1: intra-pore synthesis and characterization", Microporous and Mesoporous Materials 60 (2003) 151-158.
Jun et al., "Synthesis of New Nanoporous Carbon with Hexagonally Ordered Mesostructure", Journal of the American Chemical Society, 2000, vol. 122 (43), 10712-10713.

(Continued)

*Primary Examiner* — Stuart Hendrickson
(74) *Attorney, Agent, or Firm* — Winstead PC

(57) ABSTRACT

Composite materials and methods of preparing $CO_2$ capture include: (1) a porous solid support comprising a plurality of porous channels; and (2) a nucleophilic source associated with the porous channels of the porous solid support. The nucleophilic source is capable of converting the captured $CO_2$ to poly($CO_2$). Methods of capturing $CO_2$ from an environment include associating the environment with the aforementioned composite materials to lead to the capture of $CO_2$ from the environment. Such methods may also include a step of releasing the captured $CO_2$ from the composite material. The associating step comprises a conversion of the captured $CO_2$ to poly($CO_2$) in the composite material. A releasing step may also include a depolymerization of the formed poly($CO_2$).

30 Claims, 12 Drawing Sheets

(56) References Cited

U.S. PATENT DOCUMENTS

| | | |
|---|---|---|
| 2008/0210901 A1 | 9/2008 | Giannantonio et al. |
| 2008/0264254 A1 | 10/2008 | Song et al. |
| 2008/0276804 A1 | 11/2008 | Sayari et al. |
| 2009/0038632 A1 | 2/2009 | Cashmore et al. |
| 2009/0169452 A1 | 7/2009 | Constantz et al. |
| 2010/0029466 A1 | 2/2010 | Woodhouse |
| 2010/0061904 A1 | 3/2010 | Lund et al. |
| 2010/0062926 A1 | 3/2010 | Woodhouse et al. |
| 2010/0139536 A1 | 6/2010 | Woodhouse et al. |
| 2010/0154636 A1 | 6/2010 | Liu et al. |
| 2010/0155335 A1 | 6/2010 | Taboada-Serrano et al. |
| 2010/0212495 A1 | 8/2010 | Gadkaree et al. |
| 2011/0005390 A1 | 1/2011 | Haugan |
| 2011/0005392 A1 | 1/2011 | Pirngruber et al. |
| 2011/0059000 A1 | 3/2011 | Constantz et al. |
| 2011/0088553 A1 | 4/2011 | Woodhouse et al. |
| 2011/0150730 A1 | 6/2011 | Baugh et al. |
| 2011/0172084 A1 | 7/2011 | Jang et al. |
| 2011/0172412 A1 | 7/2011 | Serre et al. |
| 2011/0174507 A1 | 7/2011 | Burnham et al. |
| 2011/0179948 A1 | 7/2011 | Choi et al. |
| 2011/0230334 A1 | 9/2011 | Goldberg et al. |
| 2011/0308389 A1 | 12/2011 | Graff et al. |
| 2012/0024153 A1 | 2/2012 | Barron et al. |
| 2012/0048111 A1 | 3/2012 | Nakao et al. |
| 2012/0125196 A1 | 5/2012 | Woodhouse et al. |
| 2012/0308456 A1 | 12/2012 | Leta et al. |
| 2014/0076158 A1 | 3/2014 | Tour et al. |
| 2014/0103255 A1 | 4/2014 | Barron et al. |
| 2015/0024931 A1 | 1/2015 | Tour et al. |
| 2015/0056116 A1 | 2/2015 | Tour et al. |
| 2015/0111018 A1 | 4/2015 | Tour et al. |
| 2015/0111024 A1 | 4/2015 | Tour et al. |
| 2016/0001260 A1 | 1/2016 | Tour et al. |
| 2016/0136613 A1 | 5/2016 | Tour et al. |

OTHER PUBLICATIONS

Xu et al., Preparation and characterization of novel CO2 "molecular basket" adsorbents based on polymer-modified mesoporous molecular sieve MCM-41, *Microporous Mesoporous Mater*. 2003, 62, 29.

Hwang et al. In situ Synthesis of Polymer-Modified Mesoporous Carbon CMK-3 Composites for CO2 Sequestration, *ACS Appl. Mater. Interfaces* 2011, 3, 4782.

D'Alessandro et al., Carbon dioxide capture: Prospects for new materials, Angew. Chem. Int. Ed. 49, 6058-602 (2010).

Iota et al., Quartzlike Carbon Dioxide: An Optically Nonlinear Extended Solid at High Pressures and Temperatures, *Science* 1999, 283, 1510.

Sevilla et al., Highly porous S-doped carbons. Microporous Mesoporous Mater. 158, 318-323 (2012).

Yoo et al., Crystal Structure of Carbon Dioxide at High Pressure: "Superhard" Polymeric Carbon Dioxide, C. Phys. Rev. Lett. 1999, 83, 5527.

Puxty et al., "Carbon Dioxide Postcombustion Capture: A Novel Screening Study of the Carbon Dioxide Absorption Performance of 76 Amines", Environ. Sci. Technol. 2009, 43, 6427-6433.

Siriwardane et al., "Adsorption of C02 on Molecular Sieves and Activated Carbon" Energy Fuels, 2001,15, 279-284.

Heuchel et al., "Adsorption of Carbon Dioxide and Methane and Their Mixtures on an Activated Carbon: Simulation and Experiment", Langmuir, 1999,15, 8695-8705.

Fryxell et al., "Design and Synthesis of Selective Mesoporous Anion Traps", Chem. Mater. 1999, 11, 2148-2154.

Yoshitake et al.,"Adsorption of Chromate and Arsenate by Amino-Functionalized MCM-41 and SBA-1" Chem. Mater. 2002,14,4603-4610.

Caskey et al., "Dramatic Tuning of Carbon Dioxide Uptake via Metal Substitution in a Coordination Polymer with Cylindrical Pores", J. Am. Chem. Soc. 2008,130, 10870-10871.

McDonald et al., "Enhanced carbon dioxide capture upon incorporation of N,N-dimethylethylenediamine in the metal-organic framework CuBTTri" Chem. Sci. 2011, 2, 2022-2028.

Lee et al., "Synthesis of new nanoporous carbon materials using nanostructured silica materials as templates", J. Mater. Chem. 2004, 14, 478-486.

Ryoo et al., "Ordered Mesoporous Carbons", Adv. Mater. 2001, 13, 677-681.

Kyotani et al., "Control of pore structure in carbon", Carbon 2000, 38, 269-286.

Choi et al., "Ordered nanoporous polymer-carbon composites", Nature Mater. 2003, 2, 473-476.

Zhao et al., "Triblock Copolymer Syntheses of Mesoporous Silica with Periodic 50 to 300 Angstrom Pores", Science 1998, 279, 548-552.

Joo et al., "Ordered nanoporous arrays of carbon supporting high dispersions of platinum nanoparticles", Nature 2001, 412, 169-172.

Mello et al., "Amine-modified MCM-41 mesoporous silica for carbon dioxide capture" Micropor. Mesopor. Mater., 2011, 143, 174-179.

Xu et al., "Novel Polyethylenimine-Modified Mesoporous Molecular Sieve of MCM-41 Type as High-Capacity Adsorbent for CO2 Capture" Energy Fuels, 2002, 16,1463-1469.

Choi et al., "Adsorbent Materials for Carbon Dioxide Capture from Large Anthropogenic Point Sources" ChemSusChem, 2009, 2, 796-854.

Ma et al., "'Molecular Basket' Sorbents for Separation of CO2 and H2S from Various Gas Streams", J. Am. Chem. Soc., 2009, 131,5777-5783.

Dillon et al., "Synthesis, Characterization, and Carbon Dioxide Adsorption of Covalently Attached Polyethyleneimine-Functionalized Single-Wall Carbon Nanotubes", ACS Nano, 2008, 2, 156-164.

Chang et al., "In-Situ Infrared Study of CO2 Adsorption on SBA-15 Grafted with y-Aminopropyltriethoxysilane", Energy Fuels, 2003, 17,468-473.

National Aeronautics and Space Administration brochure entitled "International Space Station Environmental Control and Life Support System." 2008.

International Search Report and Written Opinion for PCT/US2011/057695. Mailed on Aug. 10, 2012.

International Preliminary Report on Patentability for PCT/US2011/057695. Mailed on May 10, 2013.

International Search Report and Written Opinion for PCT/US2014/044315. Mailed on Jan. 1, 2015.

\* cited by examiner

A

B

A

B

COMPOSITES FOR CARBON DIOXIDE CAPTURE

CROSS-REFERENCE TO RELATED APPLICATIONS

This application claims priority to U.S. Provisional Patent Application No. 61/585,510, filed on Jan. 11, 2012. The entirety of the aforementioned application is incorporated herein by reference.

STATEMENT REGARDING FEDERALLY SPONSORED RESEARCH

Not applicable.

BACKGROUND

Traditional $CO_2$ sorbents show limited sorption and regeneration capacities, especially when used in the presence of natural gas. Furthermore, traditional $CO_2$ sorbents are expensive to produce and may require rigid conditions for regeneration. Therefore, an ongoing need exists for the development of more effective $CO_2$ sorbents.

SUMMARY

In some embodiments, the present disclosure pertains to composite materials for $CO_2$ capture. In some embodiments, the composite materials include: (1) a porous solid support with a plurality of porous channels; and (2) a nucleophilic source associated with the porous channels of the porous solid support. In some embodiments, the nucleophilic source is capable of converting the captured $CO_2$ to poly($CO_2$). In some embodiments, the polymerization can occur at pressures that range from about 1 atm to about 100 atm. In some embodiments, the captured $CO_2$ becomes sorbed to the composite material through at least one of physisorption, chemisorption, absorption, adsorption and combinations of such interactions.

In some embodiments, the porous solid support may include at least one of mesoporous carbon sources, glass, glass materials made from silicon oxide, metals, sulfur, metal oxides, metal nitrides, metal sulfides, metal selenides, and combinations thereof. In some embodiments, the porous solid support may include a mesoporous solid support, such as a mesoporous carbon source. In some embodiments, the porous solid support may include a mesoporous carbon source, such as amorphous carbons, carbon black, porous carbon black, activated carbons, graphene, expanded graphite, graphene nanoribbons, CMK-3, CMK-1, CMK-5, MCM-41, hydroxide-treated carbons (e.g., hydroxide-treated carbon black), and combinations thereof. In some embodiments, the porous solid supports may include pores with diameters that range from about 1 nm to about 100 nm.

In some embodiments, the nucleophilic source may include at least one of oxygen-centered nucleophiles, sulfur-centered nucleophiles, nitrogen-centered nucleophiles, metal oxides, metal nitrides, metal sulfides, metal selenides, and combinations thereof. In some embodiments, the nucleophilic source is a sulfur-centered source, such as sulfides, thiols, mercaptans, poly(mercaptopropyl)methylsiloxane (PMM), admantanethiol, and combinations thereof. In some embodiments, the nucleophilic source may include a metal oxide, such as an iron oxide selected from the group consisting of FeO, $\alpha$-$Fe_2O_3$, $\beta$-$Fe_2O_3$, $\gamma$-$Fe_2O_3$, $\epsilon$-$Fe_2O_3$, $Fe(OH)_2$, $Fe(OH)_3$, $\alpha$-FeOOH, $\beta$-FeOOH, $\gamma$-FeOOH, $\delta$-FeOOH, $Fe_5HO_8 \cdot nH_2O$, $5Fe_2O_3 \cdot nH_2O$, $FeOOH \cdot nH_2O$, $Fe_8O_8(OH)_6(SO_4) \cdot nH_2O$, $Fe^{3+}{}_{16}O_{16}(OH,SO_4)_{12-13} \cdot 10\text{-}12H_2O$, $Fe^{III}{}_xFe^{II}{}_y(OH)_{3x+2y-z}(A^-)_z$; where $A^-$ is $Cl^-$ or $0.5SO_4{}^{2-}$, $FeO(OH) \cdot nH_2O$, and combinations thereof.

In some embodiments, the nucleophilic source may include a metal sulfide, such as iron sulfide. In some embodiments, the nucleophilic source may be in the form of a nanoparticle having a diameter that ranges from about 0.1 nm to about 100 nm.

In some embodiments, the weight ratio of the nucleophilic source to the porous solid support is 1:1. In some embodiments, the nucleophilic source is part of the porous solid support. In some embodiments, the nucleophilic source is $Fe_3O_4$, the porous solid support is CMK-3, and the weight ratio of $Fe_3O_4$ to CMK-3 is 1:1. In some embodiments, the nucleophilic source is PMM, and the porous solid support is CMK-3. In some embodiments, the nucleophilic source is admantanethiol, and the porous solid support is CMK-3.

In some embodiments, the nucleophilic source is associated with the porous channels of the porous solid support through van der Waals interactions. In some embodiments, the nucleophilic source is associated with the porous channels of the porous solid support through covalent bonds. In some embodiments, the nucleophilic source is associated with walls of the porous channels of the porous solid support.

In some embodiments, the composite material has a surface area of more than about 1,000 $m^2/g$. In some embodiments, the composite material has a surface area between about 1,000 $m^2/g$ and about 3,000 $m^2/g$. In some embodiments, the composite material has a surface area of at least about 2,500 $m^2/g$.

Additional embodiments of the present disclosure pertain to methods of capturing $CO_2$ from an environment. In some embodiments, such methods may include associating the environment with one or more of the aforementioned composite materials to lead to the capture of $CO_2$ from the environment. In some embodiments, the methods may also include a step of releasing the captured $CO_2$ from the composite material. In some embodiments, the association can lead to the conversion of the captured $CO_2$ to poly($CO_2$) in the composite material. In such embodiments, a releasing step may include a depolymerization of the formed poly($CO_2$).

In some embodiments, the composite material captures $CO_2$ from the environment at a ratio of at least about 35% of the composite material's weight. In some embodiments, the environment comprises at least one of an industrial gas stream, natural gas stream, or a flue gas stream.

In some embodiments, the composite materials are associated with the environment by placing the composite material in contact with the environment. In some embodiments, the associating occurs at pressures that range from about 1 atm to about 100 atm. In some embodiments, the associating occurs at pressures of at least about 10 atm. In some embodiments, the associating occurs at ambient temperatures, such as temperatures that range from about 15° C. to about 30° C.

In some embodiments, the releasing step includes a reduction of pressure. In some embodiments, the pressure is reduced to less than about 10 atm. In some embodiments, the releasing occurs at temperatures that range from about 15° C. to about 30° C. In various embodiments, the releasing can occur in the absence of heating or exposure of the composite material to electrical current. In some embodiments, the composites may be reused to capture additional $CO_2$ from an environment after the releasing step.

Further embodiments of the present disclosure pertain to methods of preparing a composite material for $CO_2$ capture. In some embodiments, such methods include: (1) impregnation of a nucleophilic source into porous channels of a porous solid support; and (2) a reduction of the nucleophilic source by exposure of the nucleophilic source to a reducing agent. In some embodiments, the methods of the present disclosure may also include a step of dehydrating the porous solid support after impregnating the porous solid support with the nucleophilic source.

BRIEF DESCRIPTION OF THE FIGURES

FIG. 2A is a transmission electron micrograph (TEM) of pristine CMK-3, which shows observable channels. FIGS. 2B and 2C are TEM images of $Fe_3O_4$-CMK-3 composites, where the metal oxide particles are sub-10-nm sized. The nanoparticles of magnetite can be seen tracking with the mesopores rather than randomly dispersed, suggesting that they are embedded in the mesopores. FIG. 2D is a photograph of an $Fe_3O_4$-CMK-3 composite. The image demonstrates that the composite has paramagnetic behavior when placed near a bar magnet. FIG. 2E shows x-ray photoelectron spectroscopy (XPS) data for the $Fe_3O_4$-CMK-3 (1:1) composites. The XPS data confirm that the $Fe_3O_4$ is mainly localized in the pores of the CMK-3.

FIG. 11A shows that the $CO_2$ uptake capacity of S-containing porous carbons was about 46.0 wt % for the first run. FIG. 11B shows that the $CO_2$ uptake capacity of the S-containing porous carbons remained above 40% after eight runs.

DETAILED DESCRIPTION

Figure 1A:
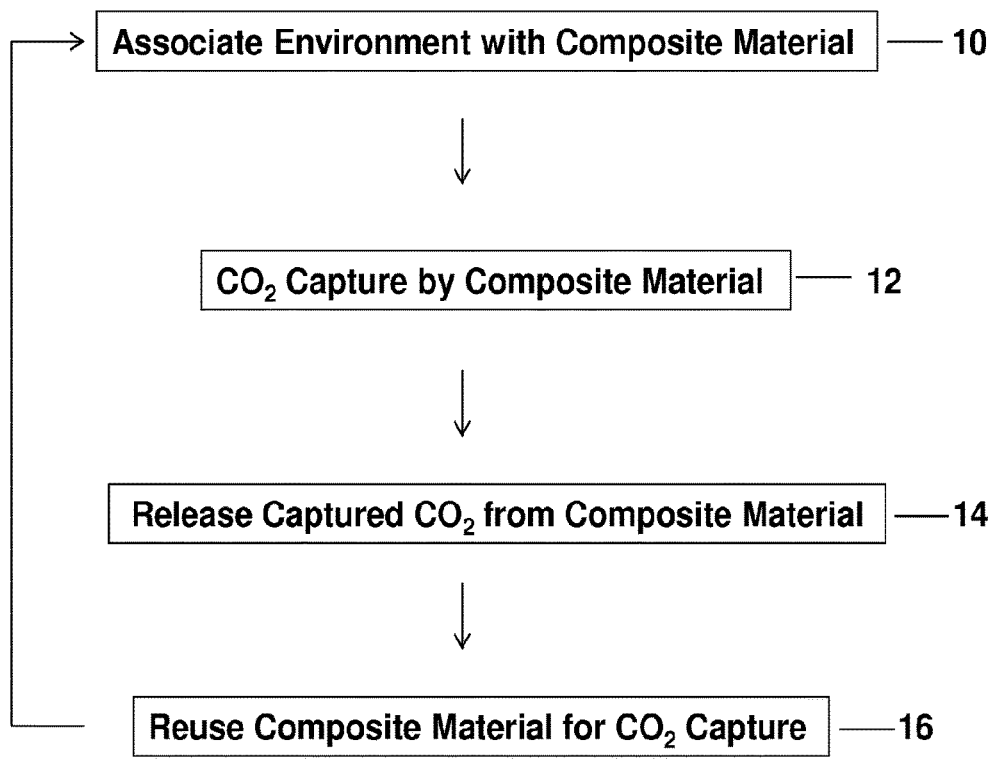
FIG. 1 shows schemes for synthesizing composite materials (FIG. 1B) and utilizing them to capture $CO_2$ (FIG. 1A).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Traditional $CO_2$ sorbents, such as activated carbons and zeolites, show moderate $CO_2$ sorption capacities, primarily due to their high surface areas. However, the selectivity of such sorbents to $CO_2$ is limited. This in turn limits the application of traditional $CO_2$ sorbents in the oil-related fields, where $CO_2$ is in the presence of hydrocarbon gases, organic gases, and inorganic gases.

Although amine polymer modified silica show good $CO_2$ selectivity and uptake capacity, they generally need much more energy for regeneration (e.g., regeneration temperatures of more than 100° C.). Recently, Applicants have shown that amine polymers could be successfully polymerized within mesoporous carbons (CMK-3) to form composites with $CO_2$ sorption capacities. See PCT/US2011/057695. Those composites required lower regeneration temperature (i.e., about 70° C.). Furthermore, the composites had 13% by weight $CO_2$ uptake capacity. In addition, the composites demonstrated optimal $CO_2$ selectivity over hydrocarbons. However, such composites demonstrated limited $CO_2$ sorption capacity under higher pressures, such as pressure ranges where oil and natural gas wells are productive (e.g., 5-70 bar and more generally 10 bar to 40 bar).

Therefore, a need exists for designing more effective $CO_2$ sorbents that can be used for higher pressure conditions, such as in oil and gas fields. Furthermore, a need exists for providing $CO_2$ sorbents with high $CO_2$ sorption capacities, high $CO_2$ selectivity, efficient regeneration, regeneration without heating (e.g., without heating over 30° C.), and reusability. The present disclosure addresses the aforementioned needs.

In some embodiments, the present disclosure provides composite materials for $CO_2$ capture that can provide high $CO_2$ sorption capacities, high $CO_2$ selectivity, efficient regeneration (e.g., regeneration at or near room temperature using a pressure change), and reusability. Additional embodiments of the present disclosure pertain to methods of utilizing such composite materials for capturing $CO_2$ from an environment. Further embodiments of the present disclosure pertain to methods of preparing the aforementioned composite materials. More specific and non-limiting examples of the aforementioned embodiments will now be described in more detail herein.

Composite Materials

Various aspects of the present disclosure pertain to composite materials for $CO_2$ capture. In some embodiments, the $CO_2$ capture may be reversible. As described in more detail below, $CO_2$ capture may occur by various mechanisms, including sorption (e.g., absorption, adsorption, physisorption, chemisorption, and combinations thereof) and $CO_2$ polymerization.

In some embodiments, the composite materials of the present disclosure may include: (1) a solid support, such as a porous solid support with porous channels; and (2) a nucleophilic source associated with the solid support. As set forth in more detail herein, various solid supports and nucleophilic sources may be utilized in the composites of the present disclosure.

Solid Supports

In some embodiments, solid supports that can be used in the composites of the present disclosure may include porous solid supports. Porous solid supports may include, without limitation, mesoporous carbon sources, glasses, glass materials made from silicon oxide, metals, metal oxides, metal nitrides, sulfides, metal sulfides, metal selenides, and combinations thereof. In some embodiments, the porous solid support may be treated with hydroxides. In some embodiments, the porous solid support may include one or more metals, such as silicon, boron, calcium, cobalt, copper, gold, indium, iron, lead, lithium, magnesium, manganese, nickel, palladium, platinum, potassium, ruthenium, rhodium, samarium, scandium, selenium, silver, sodium, tantalum, tin, titanium, tungsten, vanadium, zinc, zirconium and combinations thereof. In some embodiments, the porous solid support may be a glass material made from silicon oxide, such as SBA-15.

In some embodiments, the porous solid support may include a mesoporous solid support, such as a mesoporous carbon source. Mesoporous carbon sources generally refer to carbon sources that are porous. In some embodiments, mesoporous carbon sources may include at least one of amorphous carbons, carbon black, porous carbon black, activated carbons, graphene, expanded graphite, graphene nanoribbons, hydroxide-treated carbons (e.g., hydroxide treated carbon black), and combinations thereof. In some embodiments, the mesoporous carbon sources may be derived from micron-sized or nanometer-sized carbon black sources that were treated with hydroxide.

In some embodiments, the mesoporous carbon sources may be at least one of graphitized carbon black, powdered activated carbons, granular activated carbons, extruded activated carbons, bead activated carbons, polymer coated activated carbons, metal-impregnated activated carbons, and combinations thereof. In some embodiments, the mesoporous carbon sources may include CMK-3. In some embodiments, the mesoporous carbon sources may include CMK-1, CMK-5, MCM-41, and combinations thereof.

The porous solid supports of the present disclosure can also have various pore sizes. In some embodiments, the porous solid supports may have pore diameters that range from about 1 micron to about 10 microns, or from about 0.1 microns to about 1 micron. In some embodiments, the porous solid supports of the present disclosure may have pore diameters that range from about 1 nm to about 100 nm. In some embodiments, the porous solid supports of the present disclosure may have pore diameters that range from about 1 nm to about 50 nm. In more specific embodiments, the porous solid supports of the present disclosure may have pore diameters that are about 15 nm.

Nucleophilic Sources

The porous solid supports of the present disclosure may be associated with various nucleophilic sources. In some embodiments, the nucleophilic sources may be separate molecules or nanoparticles that are associated with the porous solid supports of the present disclosure. In some embodiments, the nucleophilic sources may be components or parts of the porous solid support framework. For instance, in some embodiments, the nucleophilic sources may be moieties that are also structural parts of a porous solid support matrix.

In some embodiments, the nucleophilic sources of the present disclosure may include at least one of oxygen-centered nucleophiles, sulfur-centered nucleophiles, nitrogen-centered nucleophiles, and combinations thereof. In some embodiments, the nucleophilic sources may include at least one of metal oxides, metal nitrides, metal sulfides, metal selenides, and combinations thereof.

In some embodiments, the nucleophilic source may be a sulfur-centered source. In some embodiments, the sulfur-centered source may include at least one of sulfides, thiols, mercaptans, and combinations thereof. In some embodiments, the sulfur-centered source may be a moiety within a porous solid support. In some embodiments, the sulfur-centered source may be a molecule that is associated with the porous solid support. In more specific embodiments, the sulfur-centered source may include admantanethiol. In some embodiments, the sulfur-centered source may include a sulfur-containing polymer, such as poly(mercaptopropyl)-methylsiloxane (PMM), poly[(2-hydroxymethyl)thiophene], and the like. In some embodiments, the sulfur-centered sources may include water soluble thiophene adducts, such as poly(3,4-ethylenedioxythiophene) (PDOT), 2-(hydroxymethyl)thiophene or 2-mercaptoethanol.

In some embodiments, nucleophilic sources may contain one or more metals, transitional metals or metalloids. In some embodiments, the nucleophilic sources may include nucleophilic metals, such as metal oxides or metal sulfides.

In some embodiments, the nucleophilic sources may include a metal oxide. In some embodiments, the metal oxides may include at least one of iron oxides, aluminum oxides, zinc oxides, boron oxides, gallium oxides, indium oxides, thallium oxides, silver oxides, lead oxides, molybdenum oxides, magnesium oxides/hydroxides, boron oxides/hyroxides, lithium oxides/hydroxides, potassium oxides/hydroxides, calcium oxides/hydroxides, barium oxides/hydroxides, sodium oxides/hydroxides, and combinations thereof. In some embodiments, the metal oxides may include an iron oxide, such as FeO, $\alpha$-$Fe_2O_3$, $\beta$-$Fe_2O_3$, $\gamma$-$Fe_2O_3$, $\epsilon$-$Fe_2O_3$, $Fe(OH)_2$, $Fe(OH)_3$, $\alpha$-FeOOH, $\beta$-FeOOH, $\gamma$-FeOOH, $\delta$-FeOOH, $Fe_5HO_8 \cdot nH_2O$, $5Fe_2O_3 \cdot nH_2O$, $FeOOH \cdot nH_2O$, $Fe_8O_8(OH)_6(SO_4) \cdot nH_2O$, $Fe^{3+}_{16}O_{16}(OH, SO_4)_{12-13} \cdot 10\text{-}12H_2O$, $Fe^{III}_xFe^{II}_y(OH)_{3x+2y-z}(A^-)_z$; where $A^-$ is $Cl^-$ or $0.5SO_4^{2-}$, $FeO(OH) \cdot nH_2O$, and combinations thereof. In some embodiments, the nucleophilic sources may include $Fe_3O_4$. In some embodiments, the nucleophilic sources may include $Fe_2O_3$.

In some embodiments, the nucleophilic sources of the present disclosure may include a metal sulfide. In some embodiments, the metal sulfide may include, without limitation, iron sulfides, aluminum sulfides, zinc sulfides, boron sulfides, gallium sulfides, indium sulfides, thallium sulfides, silver sulfides, lead sulfides, molybdenum sulfides, magnesium sulfides, boron sulfides, lithium sulfides, potassium sulfides, calcium sulfides, barium sulfides, sodium sulfides and combinations thereof.

The nucleophilic sources of the present disclosure may also have various shapes and sizes. For instance, in some embodiments, the nucleophilic sources of the present disclosure may be in the form of particles, such as microparticles or nanoparticles. In some embodiments, the nucleophilic sources of the present disclosure may have diameters that range from about 0.1 nm to about 100 nm. In some embodiments, the nucleophilic sources of the present disclosure may have diameters of less than about 15 nm. In some embodiments, the nucleophilic sources of the present disclosure may have diameters that range from about 0.1 micrometer to about 100 micrometers.

In some embodiments that are described in more detail herein, the nucleophilic sources of the present disclosure are capable of converting the captured $CO_2$ to poly($CO_2$). See, e.g., FIG. 9.

Variations

The composite materials of the present disclosure can include various porous solid supports and nucleophilic sources at various weight ratios. For instance, in some embodiments, the weight ratio of the nucleophilic source to the porous solid support in a composite material may be 1:1, 2:1, 3:1, 1:2, or 1:3. In more specific embodiments, the weight ratio of the nucleophilic source to the porous solid support in the composite material is 1:1.

In some embodiments, the nucleophilic source in the composite material is $Fe_3O_4$, and the porous solid support is CMK-3 (i.e., magnetite decorated mesoporous carbon or $Fe_3O_4$-CMK-3). In further embodiments, the weight ratio of $Fe_3O_4$ to CMK-3 in the $Fe_3O_4$-CMK-3 composite is 1:1. In some embodiments, the nucleophilic source in the composite material is poly(mercaptopropyl)methylsiloxane (PMM) and the porous solid support is CMK-3 (i.e., PMM-CMK-3). In some embodiments, the nucleophilic source in the composite material is admantanethiol and the porous solid support is CMK-3 (i.e., admantanethiol-CMK-3).

Furthermore, nucleophilic sources may be associated with porous solid supports in various manners. For instance, in some embodiments, the nucleophilic source is associated with the porous channels of the porous solid support. In some embodiments, the nucleophilic source is associated with the porous channels of the porous solid support through non-covalent interactions, such as van der Waals interactions. In some embodiments, the nucleophilic source is associated with the porous channels of the porous solid support through covalent bonds. In some embodiments, the nucleophilic source is associated with walls of the porous channels of the porous solid support. In some embodiments, the nucleophilic source may be within the walls of the porous channels of the porous solid support.

Moreover, the composite materials of the present disclosure can have various surface areas. For instance, in some embodiments, the composite materials of the present disclosure have a surface area of more than about 1,000 $m^2/g$. In some embodiments, the composite materials of the present disclosure have a surface area between about 1,000 $m^2/g$ and about 3,000 $m^2/g$. In some embodiments, the composite materials of the present disclosure have a surface area of at least about 2,500 $m^2/g$.

As set forth in more detail herein, the composite materials of the present disclosure can also have various $CO_2$ sorption capacities.

Methods of $CO_2$ Capture

Further embodiments of the present disclosure pertain to methods of capturing $CO_2$ from various environments. An exemplary method of capturing $CO_2$ from an environment is illustrated in FIG. 1A. In this example, $CO_2$ from an environment is associated with a composite material (Step 10). Thereafter, the $CO_2$ from the environment becomes captured by the composite material (Step 12). Next, the captured $CO_2$ is released from the composite material by various mechanisms, such as pressure reduction or heat (Step 14). The regenerated composite material can then be reused to capture more $CO_2$ from an environment (Step 16).

As set forth in more detail herein, the methods of capturing $CO_2$ can have various embodiments. For instance, various methods may be used to associate composite materials with $CO_2$ from different environments. Furthermore, various methods may be used to release the captured $CO_2$ and reuse the regenerated composite materials. In various embodiments, the methods of the present disclosure may lack a $CO_2$ release step, or a step of reusing the regenerated composites.

Association of Composite Materials with Environments

Various methods may be used to associate composite materials with various environments. For instance, in some embodiments, the association includes incubating the environment with a composite material. In some embodiments, the association occurs by placing the composite material in contact with the environment. In some embodiments, the composite material is placed in a pipe, and the $CO_2$-containing environment is flowed through the pipe where it comes in contact with the composite material. In some embodiments, the composite material is in a floating bed that rides on the $CO_2$-containing environment as it enters as a gaseous stream below the bed.

The composite materials of the present disclosure may be associated with environments under various conditions. For instance, in some embodiments, the association can occur at pressures that range from about 1 atm to about 800 atm, or from about 1 atm to about 100 atm. In some embodiments, the association can occur at pressures of more than about 10 atm.

Likewise, the association can occur at temperatures that range from about −190° C. to about 25° C. In some embodiments, the association can occur at ambient temperatures, such as temperatures that range from about 15° C. to about 30° C.

Environments

The $CO_2$ capture methods of the present disclosure may be applied to various environments. In some embodiments, the environment may include at least one of an industrial gas stream, natural gas stream, or a flue gas stream. In some embodiments, the environment is an industrial gas stream. In some embodiments, the environment is a natural gas stream. In some embodiments, the composite material is within a structure that is further mounted in an underwater environment, such as a marine environment or a submarine environment or sub platform environment. In some embodiments, the environment is a flue gas stream. In some embodiments, the environment is an oil or gas field. In some embodiments, the environment that contains the $CO_2$ to be captured is a natural gas stream that contains methane, ethane, propane, or combinations of such gases. In some embodiments, the composite material is within a structure that is further mounted in a space vehicle or station.

$CO_2$ Capture

The methods of the present disclosure may be used to capture $CO_2$ from an environment by various mechanisms.

For instance, in some embodiments, $CO_2$ capture may include the reversible or irreversible capture of $CO_2$ from an environment. In some embodiments, $CO_2$ capture may involve the capture and programmed rapid release of $CO_2$ from an environment. In some embodiments, $CO_2$ capture may involve the sequestration of $CO_2$ from an environment.

In some embodiments, $CO_2$ capture may involve the sorption of $CO_2$ to a composite material. In some embodiments, the sorption may occur by at least one of absorption, adsorption, chemisorption, physisorption and combinations of such methods. In some embodiments, $CO_2$ capture may involve the adsorption of $CO_2$ to a composite material. In some embodiments, $CO_2$ capture may involve the absorption of $CO_2$ to a composite material. In some embodiments, $CO_2$ capture may involve the reversible absorption of $CO_2$ by a composite material.

Furthermore, the $CO_2$ may be in various states upon capture by the composite materials of the present disclosure. For instance, in some embodiments, the captured $CO_2$ may be in a gaseous state, a liquid state, or combinations of such states. In more specific embodiments, gaseous $CO_2$ may first liquefy before it sorbs onto a composite material.

In some embodiments, $CO_2$ capture may involve the conversion of $CO_2$ to poly($CO_2$) molecules within the composite material. For instance, in some embodiments, the captured $CO_2$ may reside primarily as poly($CO_2$) within pores of a porous solid support. Without being bound by theory, it is envisioned that, in some embodiments, various nucleophilic sources may initiate the polymerization of captured $CO_2$ to poly($CO_2$) within the pores of the porous solid support. See, e.g., FIG. 9. In some embodiments, the poly($CO_2$) may become thermodynamically stabilized within the pores of the porous solid support. In some embodiments, the captured $CO_2$ may be in a gaseous state when it polymerizes to form poly($CO_2$). In some embodiments (e.g., embodiments where the environment is under pressured conditions), gaseous $CO_2$ may first liquefy before it forms poly($CO_2$). In more specific embodiments, the gaseous $CO_2$ may liquefy as it becomes captured in the porous channels (such as by physisorption, chemisorption, adsorption or absorption).

Furthermore, the composite materials of the present disclosure can capture various amounts of $CO_2$ from an environment. For instance, in some embodiments, the composite materials of the present disclosure can capture $CO_2$ at a ratio of between about 20% to about 100% of the composite material's weight. In some embodiments, the composite materials of the present disclosure can capture $CO_2$ at a ratio of at least about 90% of the composite material's weight. In some embodiments, the composite materials of the present disclosure can capture $CO_2$ at a ratio of more than about 100% of the composite material's weight. In some embodiments, the composite materials of the present disclosure can capture $CO_2$ at a ratio of greater than 100% of the composite material's weight, but less than 500% of the composite material's weight. In some embodiments, the composite materials of the present disclosure can capture $CO_2$ at a ratio of greater than 100% of the composite material's weight, but less than 200% of the composite material's weight. In some embodiments, the composite materials of the present disclosure can capture $CO_2$ at a ratio of greater than 10% of the composite material's weight, but less than 100% of the composite material's weight.

In more specific embodiments, the composites of the present disclosure may reversibly absorb $CO_2$ from an environment at a ratio of at least about 35% of the composite material's weight. In some embodiments, the composite material may absorb $CO_2$ from an environment at a ratio of more than 100% of the composite material's weight.

It is to be understood that, in many embodiments, a $CO_2$ capture step is often exothermic. Hence, a cooling of the composite and its container may often be helpful or required during the capture step. Thus, in some embodiments, the $CO_2$ capture step may also involve a subsequent or simultaneous cooling step. In some embodiments, a cooling step may occur prior to the $CO_2$ capture step.

$CO_2$ Release

In some embodiments, the methods of the present disclosure may also include a step of releasing captured $CO_2$ from the composite material. Various methods may also be used to release $CO_2$ from a composite material.

For instance, in some embodiments, the release of captured $CO_2$ may include a reduction of pressure, such as a composite's container pressure. In some embodiments, the pressure may be reduced to less than about 10 atm.

In some embodiments, the release of captured $CO_2$ may occur at ambient temperature, such as temperatures that range from about 15° C. to about 30° C. Thus, in some embodiments, the release of captured $CO_2$ can occur in the absence of heating. In further embodiments, the release of captured $CO_2$ can occur without exposing the composite material to electrical current or an applied voltage.

In further embodiments, the release of captured $CO_2$ may involve a heating step. For instance, in some embodiments, the composite material may be heated to more than about 20° C. and less than about 300° C.

In some embodiments where the captured $CO_2$ has formed poly($CO_2$), the $CO_2$ release step may include a depolymerization of the formed poly($CO_2$). In some embodiments, the poly($CO_2$) depolymerization is induced by the lowering of pressure, such as a composite's container pressure. In some embodiments, the pressure is lowered to less than about 10 atm.

It is also to be understood that, in many embodiments, a $CO_2$ release step is often endothermic. Hence, a heating of the composite or its container may often be helpful or required during the release step. Furthermore, since the capture and release steps can often be exothermic and endothermic, respectively, an efficient method for $CO_2$ capture and release could be to use a heat transfer between the two separate yet conjoined or nearby composite vessels to exchange the thermal energies during cycling.

Reuse

In various embodiments, the composite materials of the present disclosure are able to regenerate $CO_2$ sorption capacity after $CO_2$ release. Thus, in some embodiments, the methods of the present disclosure may also include a step of reusing the composite material to capture additional $CO_2$ from an environment. In some embodiments, the composite materials of the present disclosure may be reused multiple times without losing $CO_2$ sorption or regeneration capacities. For instance, Applicants envision that the composite materials of the present disclosure may be reused anywhere from 4-5 times to over 1,000 times without losing $CO_2$ sorption or regeneration capacities.

$CO_2$ Storage

Further embodiments of the present disclosure may also include a step of storing the captured $CO_2$. For instance, in some embodiments, the composite materials with the captured $CO_2$ may be subjected to a lower pressure while the $CO_2$ that evolves from the composite at these lower pressures is pumped below ground or into a pressurized storage facility or into an industrial chemical stream. In some embodiments, the composite materials with the captured CO$_2$ may be subjected to increased temperature while the CO$_2$ that evolves from the composite at these increased temperatures is pumped below ground or into a pressurized storage facility or into an industrial chemical stream.

Composite Material Preparation

Figure 1B:
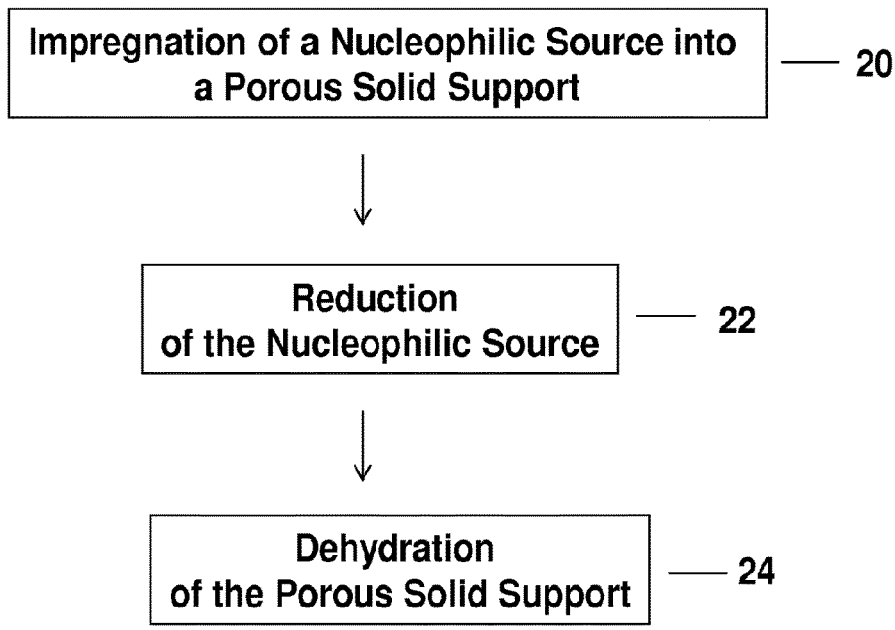

Additional embodiments of the present disclosure pertain to methods of preparing composite materials of the present disclosure. An exemplary scheme for such methods is illustrated in FIG. 1B, where the methods include: impregnation of a nucleophilic source into a porous channels of a porous solid support (Step 20); reduction of the nucleophilic source (Step 22); and the optional dehydration of the porous solid support (Step 24).

In some embodiments, the nucleophilic source may be impregnated into the porous channels of a porous solid support while the porous solid support is being formed. In such embodiments, the nucleophilic source may become part of the porous solid support framework.

Various methods may be used to reduce the nucleophilic source. For instance, in some embodiments, the reduction occurs by exposure of the nucleophilic source to a reducing agent. In some embodiments, the reducing agent may include at least one of formic acid, sodium borohydride, alcohol, H$_2$ and combinations thereof. In some embodiments, the reducing agent is H$_2$.

In some embodiments, the nucleophilic source is reduced at temperatures that range from about 20° C. to about 100° C. In some embodiments, the nucleophilic source is reduced at temperatures greater than 100° C.

Various methods may also be used to optionally dehydrate the porous solid support. In some embodiments, the dehydrating occurs after impregnating the porous solid support with a nucleophilic source. In some embodiments, the dehydrating occurs by heating the porous solid support. In some embodiments, the porous solid supports may be heated at temperatures of about 110° C.

In further embodiments, the methods of the present disclosure may also include a step of oxidizing the nucleophilic source. In more specific embodiments where the nucleophilic source is a metal salt, the metal salt may be oxidized to form a metal oxide. Further embodiments of the present disclosure may also include a step of treating the formed metal oxide with hydrogen sulfide to form a metal sulfide. In more specific embodiments, the metal salt may be impregnated into walls and pores of a porous solid support while the porous solid support is being formed.

Applications and Advantages

The composite materials of the present disclosure improve most of the disadvantages of traditional CO$_2$ sorbents by at least providing high CO$_2$ capture, high CO$_2$ selectivity, effective regeneration, and effective reusability over numerous cycles. For instance, as set forth in more detail in the Examples herein, many of the composite materials of the present disclosure (e.g., Fe$_3$O$_4$-CMK-3) have over 35 wt % CO$_2$ uptake capacities at pressures and temperatures of ~10 atm and 23° C., respectively. Such CO$_2$ uptake capacities are nearly 3-7 times higher than that found in zeolites or activated carbons under similar conditions.

In addition, the composite materials of the present disclosure can exhibit CO$_2$ selectivity over other gases, such as alkane gases (e.g., CH$_4$). Such properties are advantageous for CO$_2$ uptake over hydrocarbon uptake in CO$_2$-containing natural gas streams. For instance, metal oxide frameworks (MOFs) do not generally show such selectivity because MOFs normally operate on selectivity that is based upon molecular size. And since CO$_2$ and CH$_4$ are similar in size, selectivity in metal oxide frameworks (MOFs) is generally poor.

Without being bound by theory, and based on the features from the combination between the nucleophilic source and the porous solid support, Applicants have observed that many of the captured CO$_2$ molecules can polymerize within the porous solid supports in the presence of the nucleophile to form poly(CO$_2$). In previous studies, poly(CO$_2$) only formed at much higher pressures of 1.5 GPa (=15000 bar≈14800 atm). Hence, the methods and composites of the present disclosure substantially enhance the stability of the formed poly(CO$_2$), thereby promoting more CO$_2$ uptake.

Likewise, many of the composite materials of the present disclosure (e.g., Fe$_3$O$_4$-CMK-3) can be spontaneously regenerated in minutes when returned to atmospheric pressure (e.g., 1 atm). In addition, the regeneration can occur at ambient temperatures (e.g., 23° C.) without the need for heat treatment, as is required with conventional CO$_2$ sorbents. Thus, the composites of the present disclosure may not need any heating steps (including thermal swings) that could potentially present thermal insults to the composites. As such, many of the composite materials of the present disclosure (e.g., Fe$_3$O$_4$-CMK-3) can be used over successive cycles without changing their original CO$_2$ sorption capacities.

In view of the aforementioned advantages, the composite materials of the present disclosure can provide widespread applications in numerous fields, including CO$_2$ capture in oil and gas fields. The composite materials of the present disclosure can also provide applications in CO$_2$ flux gas capture. The composite materials of the present disclosure can also be used for CO$_2$ capture in aerospace and submarine environments.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Synthesis and Characterization of Nucleophile-Modified Mesoporous Carbon Composites This example describes the synthesis and characterization of various nucleophile-modified mesoporous carbon composites, including magnetite decorated mesoporous carbon composites (Fe$_3$O$_4$-CMK-3) and sulfur-containing mesoporous carbon composites (e.g., FeS-CMK-3). The composites were confirmed to have high CO$_2$ sorption capacities, stability and reusability.

Synthesis of Nucleophile-Modified Mesoporous Carbon Composites

To synthesize the aforementioned composites, Applicants combined a mesoporous carbon (CMK-3) with various nucleophiles, as illustrated in Schemes 1(a)-(d).

Scheme 1.
Synthesis routes for four different nucleophile-modified
mesoporous carbon composites for $CO_2$ capture.

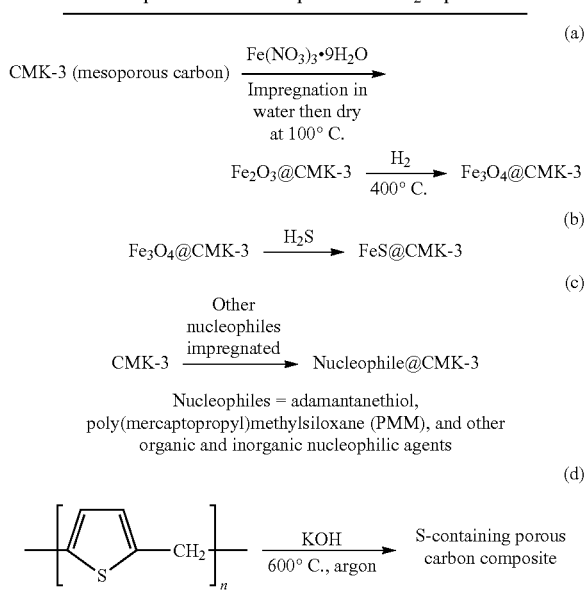

For instance, scheme 1(a) shows the synthesis of magnetite-modified mesoporous carbon composite ($Fe_3O_4$-CMK-3). First, mesoporous carbon (CMK-3) was synthesized by a process that was described previously (i.e., through replication of the structure of the SBA-15 silica template). See Hwang, C. et al. *ACS Appl. Mater. Interfaces* 2011, 3, 4782. The pore sizes of the formed mesoporous channels could be tuned from 2 nm to 10 nm based on the chosen silica template.

Next, the synthesized CMK-3 was impregnated with $Fe(NO_3)_3 \cdot 9H_2O$ and stirred for 1 hour. This was followed by dehydration at 110° C. overnight. The dried rust-colored powder was confirmed to be $Fe_2O_3$-CMK-3 by x-ray photoelectron spectroscopy (XPS) measurements. Thereafter, the product was further reduced with hydrogen gas at 400° C. for 1 hour to form $Fe_3O_4$-CMK-3 composites.

As illustrated in Scheme 1(b), the $Fe_3O_4$@CMK-3 composite was treated with flowing $H_2S(g)$ at room temperature for 10 hours to form FeS-CMK-3 composites. As illustrated in Scheme 1(c), other nucleophiles, such as admantanethiol and poly(mercaptopropyl)-methylsiloxane (PMM), were chosen as $CO_2$ capturing agents. In these examples, admantanethiol or PMM were impregnated into the CMK-3. This was followed by drying at 110° C.

In additional examples illustrated in Scheme 1(d), sulfur-containing polymers, such as poly[(2-hydroxymethyl)thiophene], were chosen as a carbon precursor. The precursor was ground with a given amount of KOH. This was followed by carbonization at 600° C. under argon atmosphere. This resulted in the formation of sulfur-containing porous carbon composites.

Characterization of $Fe_3O_4$-CMK-3 Composites

Figure 2:
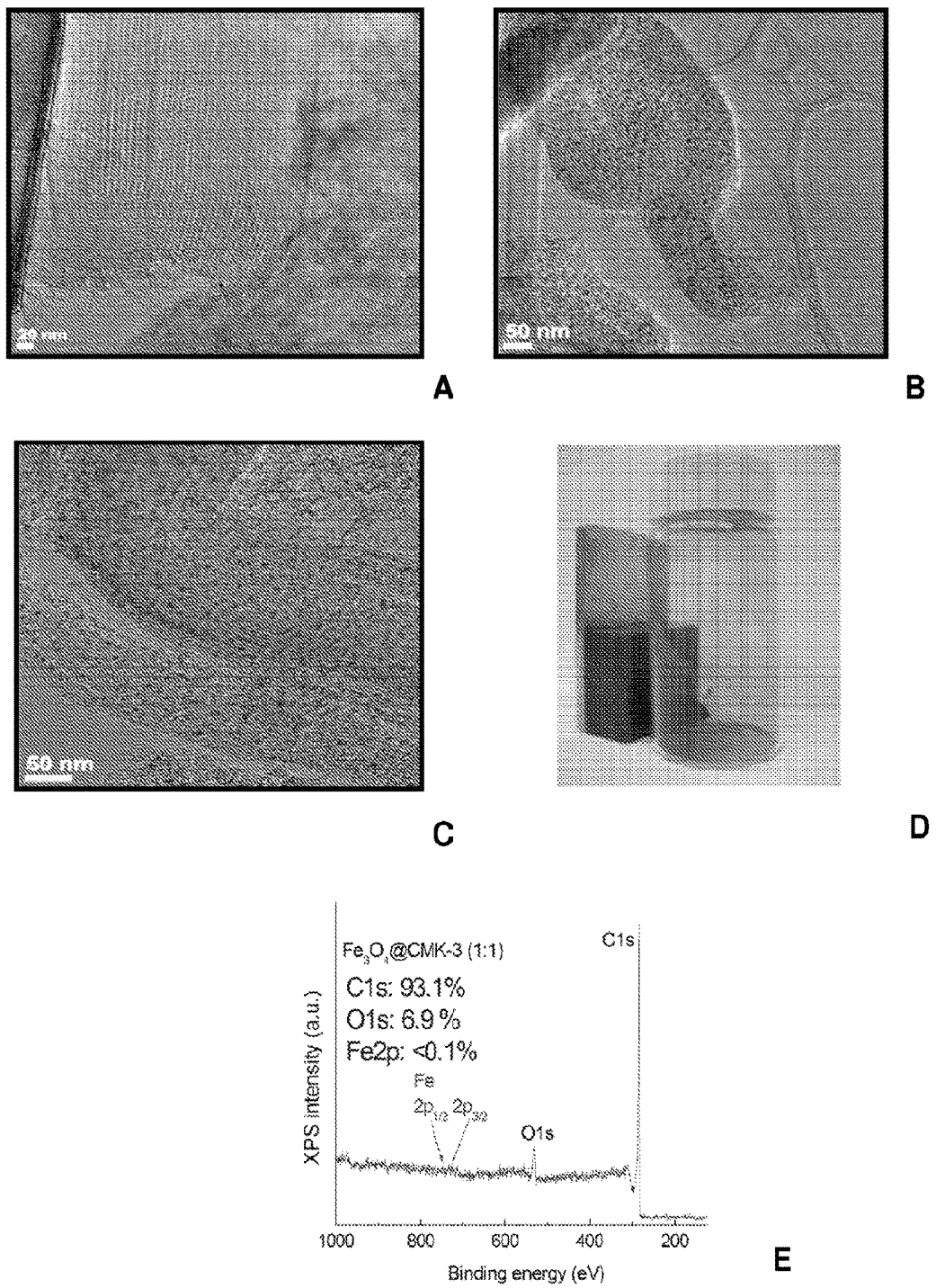
FIG. 2 shows images relating to the characterization of magnetite decorated mesoporous carbon composites ($Fe_3O_4$-CMK-3).

A transmission electron micrograph (TEM) of pristine CMK-3 before impregnation with $Fe(NO_3)_3$ $9H_2O$ (as illustrated in Scheme 1(a)) is shown in FIG. 2A. The TEM shows observable channels within the CMK-3. FIGS. 2B and 2C are TEM images of the formed $Fe_3O_4$-CMK-3 composites. The TEM shows that the channels are filled with metal oxide particles that are sub-10-nm sized and grow along with the channel direction. A photograph of the formed $Fe_3O_4$-CMK-3 composite is shown in FIG. 2D. The image demonstrates that the composite has paramagnetic behavior when placed near a bar magnet.

FIG. 1E shows the XPS data for the $Fe_3O_4$-CMK-3 (1:1) composite. According to the data, the relative atomic percentage for the iron atoms (<0.1%) is much lower than that for the carbon and oxygen. Since the XPS is a surface sensitive technique, the signals for the species that are under the surface are greatly attenuated. Hence, the data indicate that the magnetite precursors are embedded within the mesoporous channels via capillary condensation. During the $H_2$ reduction process, the magnetite nanoparticles thereby grow within the channels.

Figure 3:
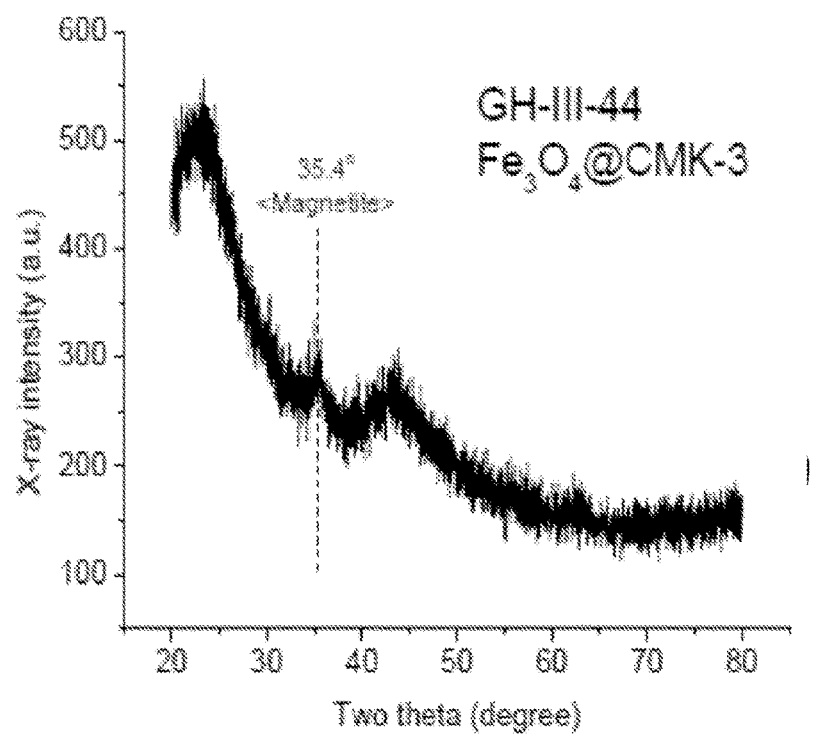
FIG. 3 shows an x-ray diffraction (XRD) pattern of a $Fe_3O_4$-CMK-3 composite.

In addition, FIG. 3 shows an x-ray diffraction (XRD) pattern of the formed $Fe_3O_4$-CMK-3 composite, confirming the presence of magnetite.

$CO_2$ Uptake by the Formed $Fe_3O_4$-CMK-3 Composites

Figure 4A:
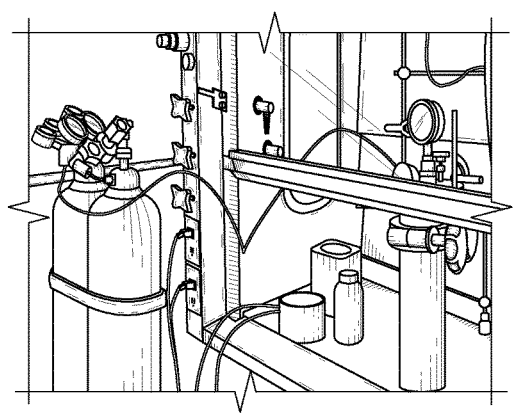
FIG. 4 shows photographs of an apparatus that can be used to test $CO_2$ uptake by $Fe_3O_4$-CMK-3 composites under pressure.
Figure 4B:
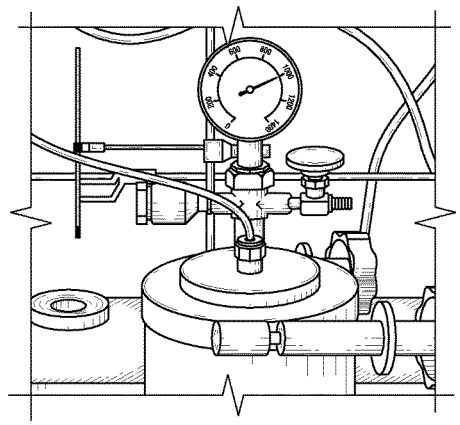
Figure 4C:
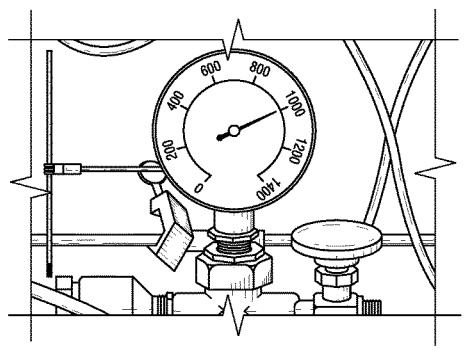
Figure 5:
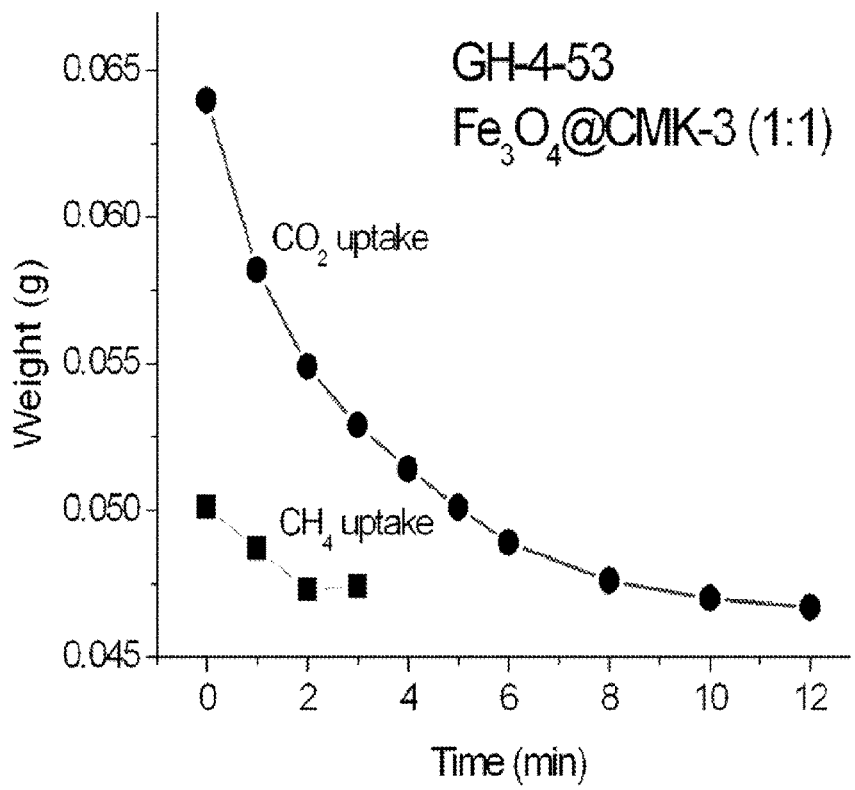
FIG. 5 is a plot of the weight of a $Fe_3O_4$-CMK-3 (1:1) composite as a function of time. The plot was measured after the composite was removed from a pressured $CO_2$ chamber and placed on a balance. The plot indicates that $Fe_3O_4$-CMK-3 has a preference for $CO_2$ over $CH_4$.

An apparatus shown in FIG. 4 was used to test the $CO_2$ uptake capacity of the formed $Fe_3O_4$-CMK-3 composites under pressure (e.g., up to 14 bar). Each composite (also referred to as sorbent) was put inside a stainless steel chamber that was equipped with a leak valve, a pressure gauge and a security valve. This was followed by purging with pure $CO_2$ for 5 minutes. Next, the leak valve was turned off. The pressure inside the system was then increased to 10 atm (145 psi). The temperature remained at 25° C. After exposure under pressured $CO_2$ for 15 minutes, the system was vented to ambient pressure. Next, the sorbent with sorbed $CO_2$ was removed to a balance for weight recording. Zeolite 13× and CMK-3 were used as controls. The results are summarized herein. FIG. 5 shows a plot relating to the $CO_2$ capture capacity of a $Fe_3O_4$-CMK-3 (1:1) composite under pressure (10 bar). According to the plot, one could see that, after $CO_2$ uptake by the $Fe_3O_4$-CMK-3 composite, it took ~12 min to release all the sorbed $CO_2$ and thereby return to its original weight. In this example, the $Fe_3O_4$-CMK-3 (1:1) composite shows ~37 wt % $CO_2$ and ~5 wt % $CH_4$ uptake capacities under 10 bar and room temperature. Furthermore, the results show that the $Fe_3O_4$-CMK-3 composite has a preference for $CO_2$ uptake rather than $CH_4$ uptake.

Figure 6:
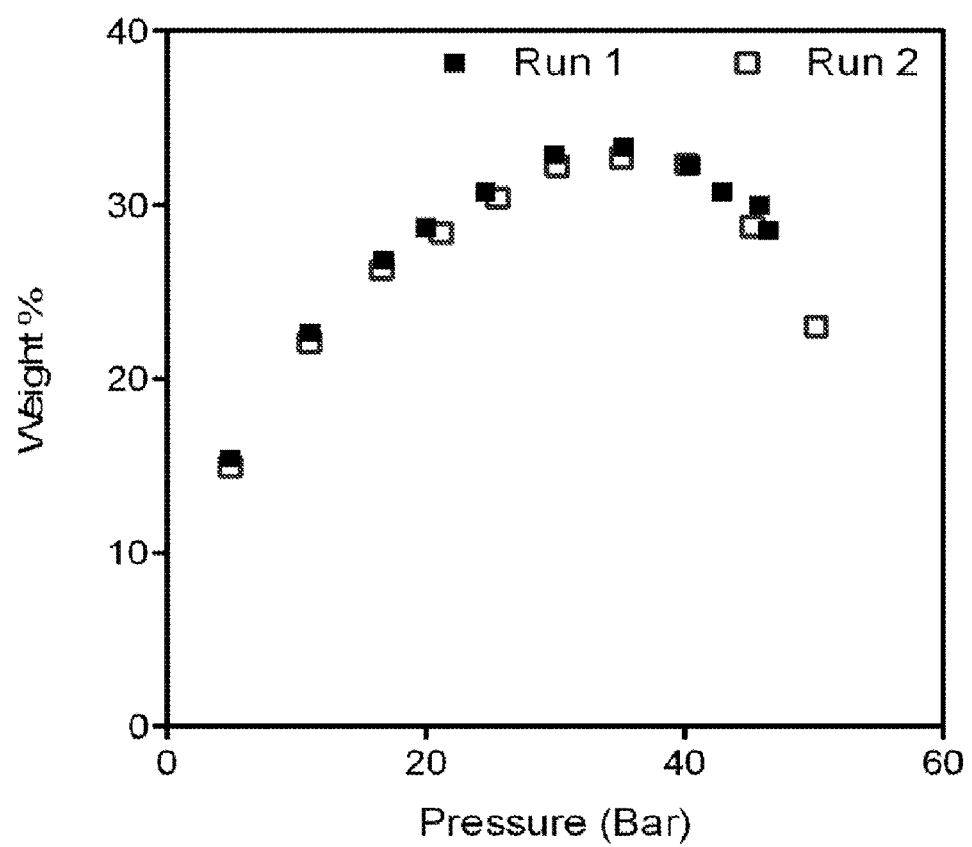
FIG. 6 shows the results of a $CO_2$ capture test by $Fe_3O_4$-CMK-3 (1:1) composites, as recorded using a Sieverts' apparatus at room temperature.

In addition to gravimetric measurements, a Sieverts' apparatus was used to provide a volumetric determination to monitor the $CO_2$ uptake capacity of $Fe_3O_4$-CMK-3 (1:1) composites over a pressure range from 1 to 50 bar. The results are shown in FIG. 6. The results show that the maximum $CO_2$ uptake capacity reached ~35 wt % during the first run before the system was vented to ambient pressure. The second run was subsequently carried out after previously sorbed $CO_2$ was removed by evacuation. The results indicate that the $Fe_3O_4$-CMK-3 composites have the ability to be regenerated by the pressure swing and become reusable.

Figure 7:
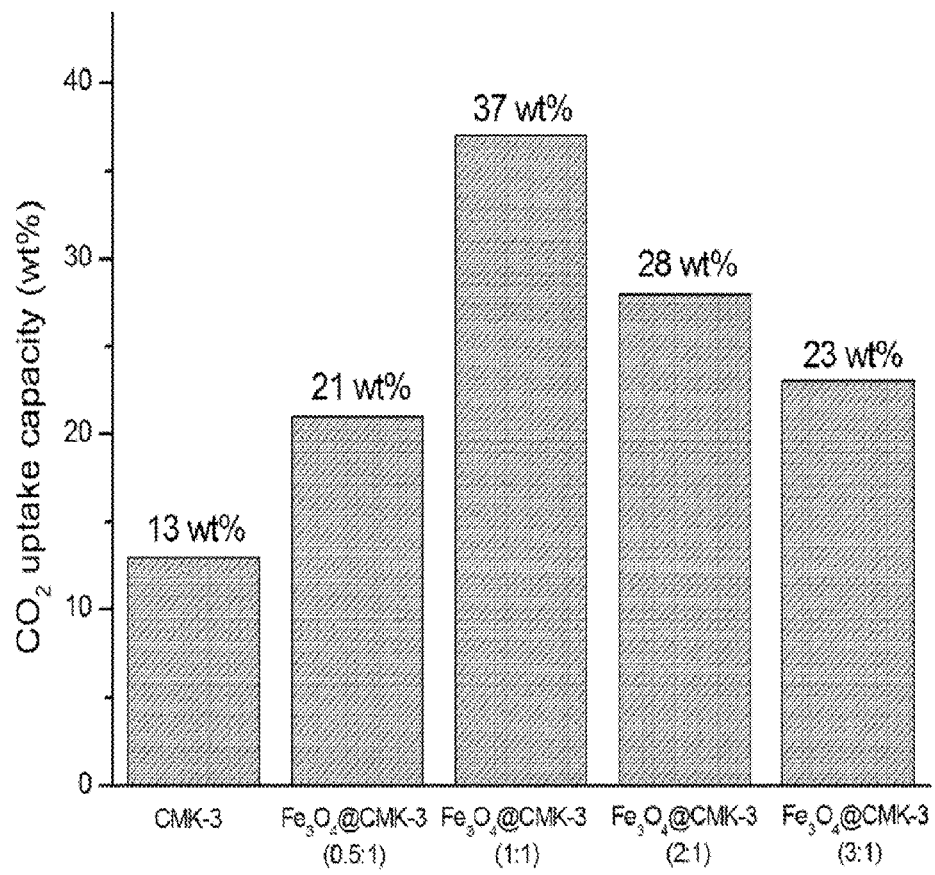
FIG. 7 is a comparison of $CO_2$ uptake capacities of $Fe_3O_4$-CMK-3 composites with different weight ratios of $Fe_3O_4$ and CMK-3. In this example, $Fe_3O_4$-CMK-3 composites with a 1:1 ratio of $Fe_3O_4$ to CMK3 showed the highest $CO_2$ capacity.

FIG. 7 shows the $CO_2$ uptake capacities of various $Fe_3O_4$-CMK-3 composites with different weight ratios of $Fe_3O_4$ and CMK-3. The numbers in parentheses indicate the weight ratios of the $Fe_3O_4$ precursor ($Fe(NO_3)_3$-$9H_2O$) to CMK-3 during the synthesis (see Scheme 1(a)). The results indicate that $Fe_3O_4$-CMK-3 composites with an equal weight ratio of $Fe_3O_4$ and CMK-3 (1:1) provided the highest $CO_2$ uptake capacity.

Poly($CO_2$) Formation in $Fe_3O_4$-CMK-3 Composites

Figure 8:
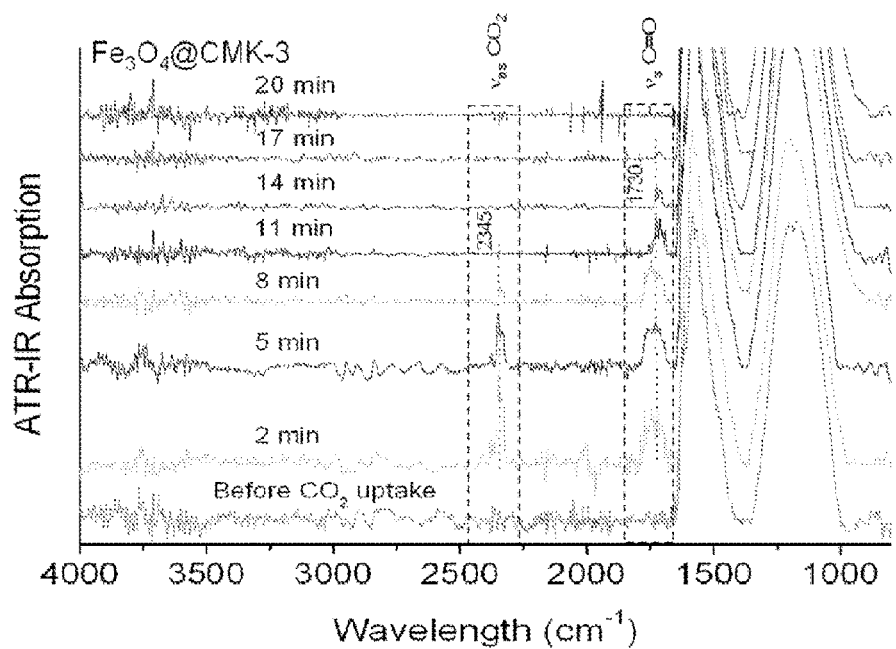
FIG. 8 shows attenuated total reflectance Fourier transform infrared spectroscopy (ATR-FTIR) results from experiments that were used to monitor $Fe_3O_4$-CMK-3 (1:1) (FIG. 8A) and CMK-3 (FIG. 8B) composites before and after $CO_2$ uptake, and during $CO_2$ removal. As discussed in more detail in the Examples section, the results indicate that the captured $CO_2$ in $Fe_3O_4$-CMK-3 composites forms poly($CO_2$) within the composites.
Figure 8:
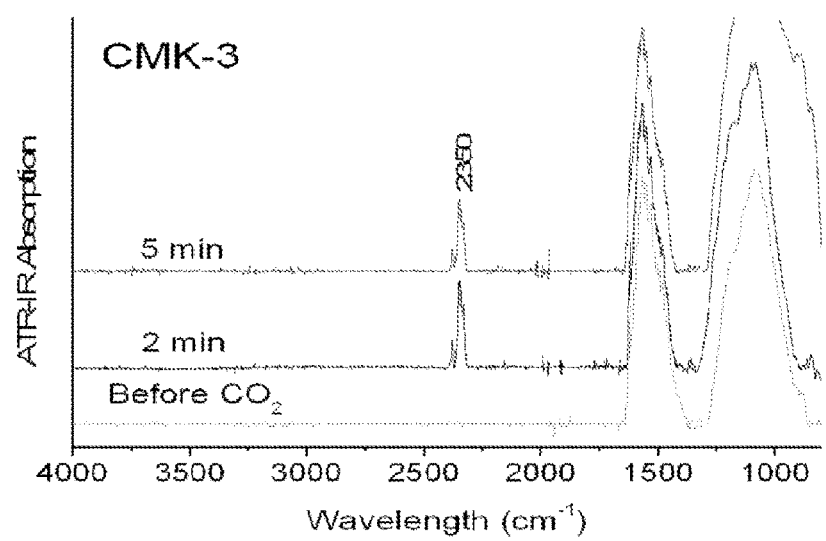

As shown in FIG. 8, the $CO_2$ uptake capacities of CMK-3 (FIG. 8B) and $Fe_3O_4$-CMK-3 composites (FIG. 8A) were studied by attenuated total reflectance Fourier transform infrared spectroscopy (ATR-FTIR). The measurements were made before and after $CO_2$ uptake at 10 bar. The measurements were also made after $CO_2$ removal upon returning the pressure to 1 bar of air. Both of the sorbents were first charged to 10 bar at room temperature, kept isobaric for 15 minutes, and then vented back to 1 bar. The ATR-IR for the samples was then observed over time.

In the case of the $Fe_3O_4$-CMK-3 composites (FIG. 8A), the peak at 2345 $cm^{-1}$ was assigned to the anti-symmetric stretching from $CO_2$ physisorb on the CMK-3 surface, or the $CO_2$ that was evolved from the sorbent material. The peak centered at 1730 $cm^{-1}$ was attributed to the carbonyl symmetric stretching due to the formed poly($CO_2$) that had been proven to form only under extremely high pressure (>1.5 GPa) in the past. See, e.g., Yoo, C. S. et al., C. *Phys. Rev. Lett.* 1999, 83, 5527. Also see Iota, V. et al., *Science* 1999, 283, 1510. These results indicate that the addition of nucleophilic species (e.g., $Fe_3O_4$) to solid supports (e.g., CMK-3) could promote the polymerization of the captured $CO_2$, thereby forming poly($CO_2$), even under a moderate pressure of 10 bar.

The above ATR-FTIR results also indicate that the poly($CO_2$) could gradually depolymerize over time when at 1 bar air. In particular, the results indicate that the formed poly($CO_2$) gradually depolymerized when under ambient air pressure. Furthermore, all the $CO_2$ desorbed from the sorbent within 20 minutes.

However, only physisorb $CO_2$ was found on CMK-3 (FIG. 8B) when compared to $Fe_3O_4$-CMK-3 (FIG. 8A). Such results indicate that the nucleophile plays a significant role in producing poly($CO_2$).

Figure 9:
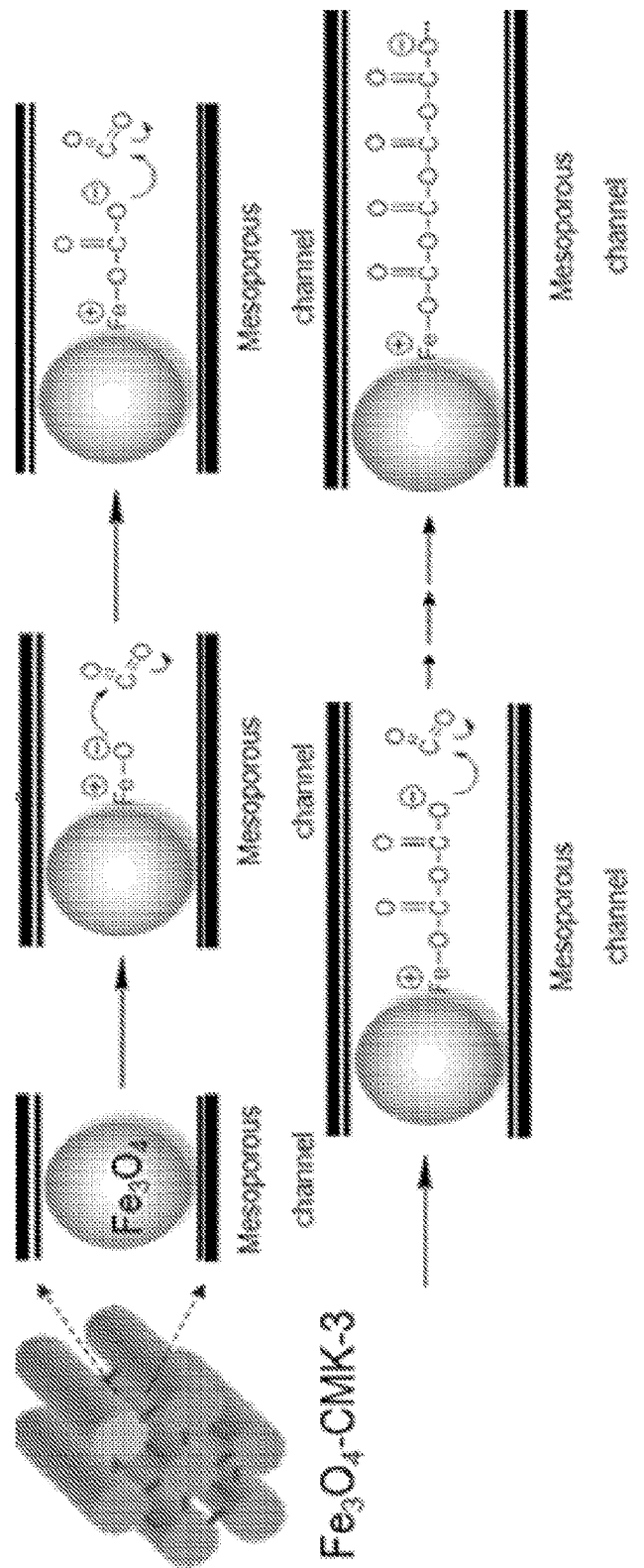
FIG. 9 is a scheme that provides a proposed mechanism for poly($CO_2$) formation in $Fe_3O_4$-CMK-3 composites. The illustrated channels, pores and polymers are not drawn to scale.
Figure 10:
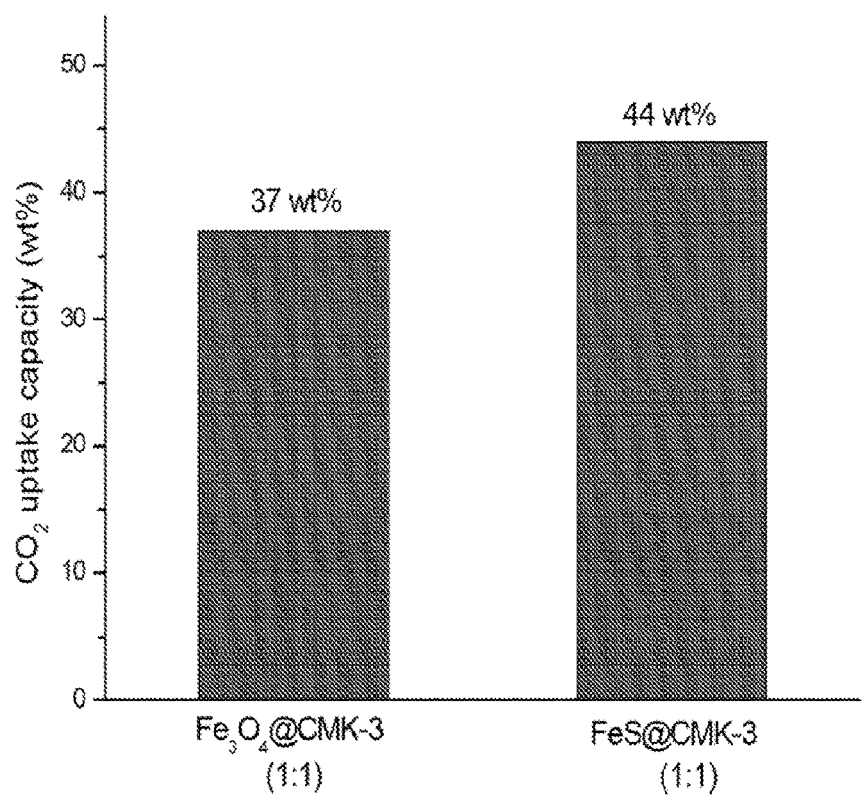
FIG. 10 provides a comparison of $CO_2$ uptake capacities of $Fe_3O_4$-CMK-3 and FeS-CMK-3 composites.

Without being bound by theory, it is envisioned that the mesoporous channel likely facilitates $CO_2$ polymerization due to the van der Waals interactions of the polymer with the pores of the CMK-3. A proposed $CO_2$ uptake and polymerization mechanism is illustrated in FIG. 9, where the nucleophile initiates the polymerization to make the metal oxide carbonate, which in turn attacks another $CO_2$ molecule to form the dimer carbonate, which then continues to propagate the polymerization. This mechanism is reversible. Once the pressure returns back to 1 bar (1 bar=14.6 psi=1 atm), the poly($CO_2$) gradually depolymerizes. Thus, the depolymerized $CO_2$ desorbs from the composite. Accordingly, the composite becomes regenerated by the pressure swing.

Formation and Characterization of Sulfur-Modified Mesoporous Carbon Composites

As illustrated in Schemes 1(b)-1(d), various methods may be utilized to form sulfur-modified mesoporous carbon composites. For instance, as shown in Scheme 1(b), the iron oxide in the $Fe_3O_4$-CMK-3 composites can be converted to iron sulfide by exposing the composite to a stream of $H_2S$. This results in the formation of FeS-CMK-3 composites. Due to this treatment, the nucleophilicity of the composite increases, as Fe—S is more nucleophilic than Fe—O.

Furthermore, when compared to $Fe_3O_4$-CMK-3, the $CO_2$ uptake capacity in Fe—S-CMK-3 increases from 37 wt % uptake to 44 wt % uptake. The other positive feature of Fe—S-CMK-3 is that it is not subject to decomposition by $H_2S$ (souring) presence in a gas well, as it is already converted to the sulfide system.

The $CO_2$ uptake capacities of other sulfur-modified mesoporous carbon composites were also studied. These included poly(mercaptopropyl)methylsiloxane (PMM)-CMK-3 (PMM-CMK-3) and admantanethiol-CMK-3.

To synthesize PMM-CMK-3 or admantanethiol-CMK-3, CMK-3 was added into a given amount of PMM or admantanethiol in 3 mL of DI-water. The slurry was stirred at room temperature for 1 hour to promote impregnation of the nucleophiles into CMK-3. This was followed by dehydration at 110° C. (Scheme 1(c)). The synthesized PMM-CMK-3 and admantanethiol-CMK-3 composites were tested under 10 bar at room temperature. The enhancement of the $CO_2$ capture was not noticeable, likely because the mesoporous structure of the CMK-3 was blocked by these nucleophilic species. The results are summarized in Table 1.

TABLE 1

$CO_2$ capture performance by CMK-3 modified with other nucleophiles, such as poly(mercaptopropyl)methylsiloxane (PMM) and admantanethiol.

| Sample | Pressure (bar) | Period (min) | $CO_2$ capacity (weight %) |
|---|---|---|---|
| PMM-CMK-3 (1:1) | 10 | 15 | 8 |
| Admantanethiol-CMK-3 (1:1) | 10 | 15 | 14 |

In order to show that $CO_2$ uptake levels on a porous solid support were not solely dependent on the CMK-3 structure, Applicants also prepared a mesoporous carbon scaffold that had sulfur impregnated as part of the carbon framework. Hence, in this Example, the nucleophile is not a subsequent additive to the porous solid support. Rather, the nucleophile is part of the solid scaffold itself.

The synthetic scheme for preparing the S-containing porous carbon is illustrated in Scheme 1(d). 14.5 g of $FeCl_3$ in 50 mL $CH_3CN$ was slowly added to a 1.5 g of 2-(hydroxymethyl)thiophene (synonyms are 2-thiophenemethanol, 2-thienyl carbinol, and thenyl alcohol) in 20 mL of $CH_3CN$. Next, the 2-(hydroxymethyl)thiophene was polymerized under dehydration conditions to form poly[(2-hydroxymethyl)thiophene] after filtration with DI water and 1 N HCl(aq). Next, 20 mg of the polymer (i.e., poly[(2-hydroxymethyl)thiophene]) was ground with 40 mg KOH. The mixture was subjected to carbonization for 1 hour at 600° C. under argon atmosphere. Without being bound by theory, treatment with KOH during a carbonization step is known to facilitate a porous carbon structure. After filtration and washing with 1 N HCl(aq) and copious amounts of DI-water, the sulfur-containing porous carbon composite was obtained.

As summarized in Table 2, the S-containing porous carbon showed a 41 wt % $CO_2$ uptake capacity at 10 bar $CO_2$ pressure. As summarized in Table 3, this result was comparable to the $CO_2$ uptake capacities for FeS-CMK-3 and $Fe_3O_4$-CMK-3. Applicants cannot rule out the chances of hydroxide being impregnated in the carbon framework and acting as nucleophilic initiators for the $CO_2$ polymerization. The surface area of the S-containing porous carbon was determined by the BET method and showed ~2500 $m^2/g$, which is nearly two times greater than the CMK-3 (~1350 $m^2/g$). The morphology and surface area could be affected by amount of the added KOH. As a comparison, sulfur powder alone under the same 10 bar $CO_2$ conditions had 11 wt % uptake of $CO_2$.

TABLE 2

$CO_2$ uptake capacity of the S-containing porous carbon material under 10 bar at room temperature.

| Sample | Pressure (bar) | Period (min) | $CO_2$ capacity (weight %) |
|---|---|---|---|
| S-containing porous carbon | 10 | 15 | 41 |

TABLE 3

Summary of CO$_2$ capture performance for various nucleophile-containing CMK-3 composites and sulfur-containing porous carbon.

| Sample | Pressure (bar) | Period (min) | CO$_2$ capacity (weight %) |
|---|---|---|---|
| CMK-3 | 10 | 15 | 13 |
| Fe$_3$O$_4$@CMK-3 (1:1) | 10 | 15 | 37 |
| FeS@CMK-3 (1:1) | 10 | 15 | 44 |
| PMM-CMK-3 (1:1) | 10 | 15 | 8 |
| Admantanethiol-CMK-3 (1:1) | 10 | 15 | 14 |
| S-containing porous carbon | 10 | 15 | 41 |
| Sulfur powder | 10 | 15 | 11 |

Figure 11:
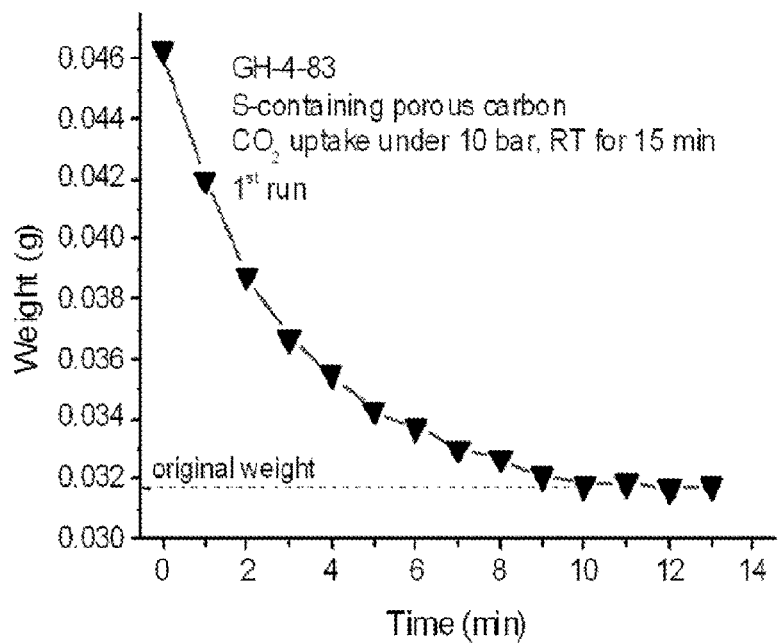
FIG. 11 provides data relating to the reusability of S-containing porous carbons.
Figure 11:
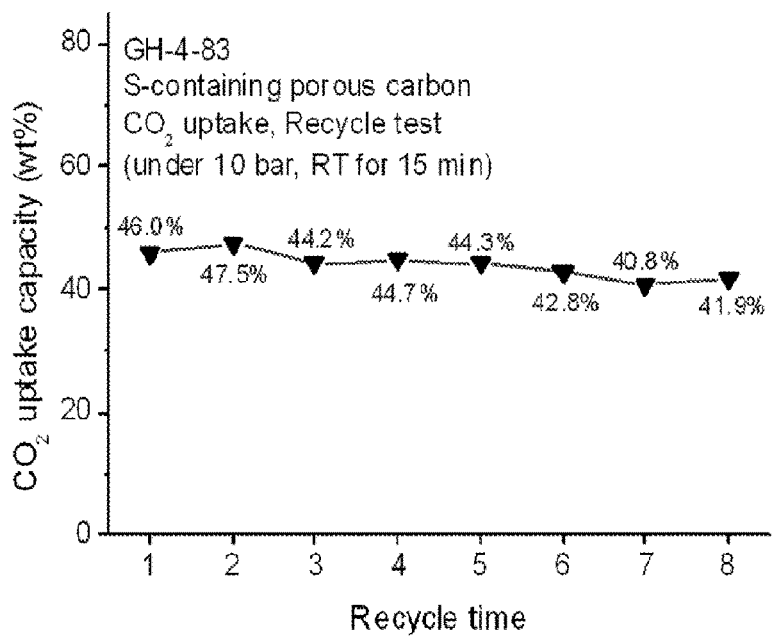

Furthermore, as summarized in FIG. 11, the CO$_2$ uptake capacity of S-containing porous carbons remained substantially the same after several regeneration steps. In particular, FIG. 11A shows that the CO$_2$ uptake capacity of S-containing porous carbons was about 46.0 wt % for the first run. As shown in FIG. 11B, the CO$_2$ uptake capacity of the S-containing porous carbons remained above 40% after eight runs. These findings indicate that the composite materials of the present disclosure can be reusable.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of capturing CO$_2$ from an environment, wherein the method comprises:
    contacting the environment with a composite material, wherein the composite material comprises:
        a porous solid support comprising a plurality of porous channels, and
        a nucleophilic source,
            wherein the nucleophilic source is in contact with the porous channels of the porous solid support,
            wherein the nucleophilic source is selected from the group consisting of sulfur-containing nucleophiles, metal oxides, metal nitrides, metal sulfides, metal selenides, and combinations thereof, and
        wherein the contacting leads to the capture of CO$_2$ from the environment; and
    releasing the captured CO$_2$ from the composite material, wherein the releasing occurs under one or more of the following conditions:
        conditions comprising a reduction of pressure;
        conditions comprising temperatures that range from about 15° C. to about 30° C.;
        conditions comprising the absence of heating; or combinations thereof.

2. The method of claim 1, wherein the contacting comprises converting CO$_2$ to poly(CO$_2$) in the composite material.

3. The method of claim 1, wherein the CO$_2$ is in a gaseous state prior to conversion to poly(CO$_2$).

4. The method of claim 1, wherein the composite material captures CO$_2$ from the environment at a ratio of at least about 35% of the composite material's weight.

5. The method of claim 1, wherein the environment comprises at least one of an industrial gas stream, natural gas stream, or a flue gas stream.

6. The method of claim 1, wherein the contacting occurs at pressures that range from about 1 atm to about 100 atm.

7. The method of claim 1, wherein the contacting occurs at pressures of at least about 10 atm.

8. The method of claim 1, wherein the contacting occurs at temperatures that range from about 15° C. to about 30° C.

9. The method of claim 1, wherein the releasing comprises a reduction of pressure.

10. The method of claim 9, wherein the pressure is reduced to less than about 10 atm.

11. The method of claim 1, wherein the releasing occurs at temperatures that range from about 15° C. to about 30° C.

12. The method of claim 1, wherein the releasing occurs in the absence of heating.

13. The method of claim 1, wherein the releasing occurs without exposing the composite material to electrical current or an applied voltage.

14. The method of claim 1,
    wherein the contacting comprises converting CO$_2$ to poly(CO$_2$) in the composite material, and
    wherein the releasing comprises a depolymerization of the formed poly(CO$_2$).

15. The method of claim 1, further comprising a step of reusing the composite material to capture CO$_2$ from an environment, wherein the reusing occurs after the releasing step.

16. The method of claim 1, wherein the porous solid support is selected from the group consisting of mesoporous carbon sources, glass, glass materials made from silicon oxide, metals, metal oxides, sulfur, metal nitrides, metal sulfides, metal selenides, and combinations thereof.

17. The method of claim 1, wherein the porous solid support comprises a mesoporous solid support.

18. The method of claim 1, wherein the porous solid support comprises a mesoporous carbon source, wherein the mesoporous carbon source is selected from the group consisting of amorphous carbons, carbon black, porous carbon black, activated carbons, graphene, expanded graphite, graphene nanoribbons, CMK-3, CMK-1, CMK-5, MCM-41, hydroxide-treated carbons and combinations thereof.

19. The method of claim 1, wherein the nucleophilic source comprises a metal oxide.

20. The method of claim 19, where the metal oxide comprises an iron oxide selected from the group consisting of FeO, α-Fe$_2$O$_3$, β-Fe$_2$O$_3$, γ-Fe$_2$O$_3$, ε-Fe$_2$O$_3$, Fe(OH)$_2$, Fe(OH)$_3$, α-FeOOH, β-FeOOH, γ-FeOOH, δ-FeOOH, Fe$_5$HO$_8$.nH$_2$O, 5Fe$_2$O$_3$.nH$_2$O, FeOOH.nH$_2$O, Fe$_8$O$_8$(OH)$_6$(SO$_4$).nH$_2$O, Fe$^{3+}_{16}$O$_{16}$(OH,SO$_4$)$_{12-13}$.10-12H$_2$O, Fe$^{III}_x$Fe$^{II}_y$(OH)$_{3x+2y-z}$(A$^-$)$_z$; where A$^-$ is Cl$^-$ or 0.5SO$_4^{2-}$, FeO(OH).nH$_2$O, and combinations thereof.

21. The method of claim 1, wherein the nucleophilic source is in contact with the porous channels of the porous solid support through van der Waals interactions.

22. The method of claim 1, wherein the nucleophilic source is in contact with the porous channels of the porous solid support through covalent bonds.

23. The method of claim 1, wherein the composite material has a surface area of more than about 1,000 m$^2$/g.

24. The method of claim 1, wherein the composite material has a surface area of at least about 2,500 m²/g.

25. The method of claim 1, wherein the capture of $CO_2$ comprises sorption of $CO_2$ to the composite material, wherein the sorption is selected from the group consisting of physisorption, chemisorption, absorption, adsorption and combinations thereof.

26. The method of claim 1, wherein the capture of $CO_2$ comprises absorption of $CO_2$ to the composite material.

27. The method of claim 1, wherein the nucleophilic source is selected from the group consisting of metal oxides, metal nitrides, metal sulfides, metal selenides, and combinations thereof.

28. The method of claim 1, wherein the nucleophilic source is selected from the group consisting of $Fe_3O_4$, FeS, and combinations thereof.

29. The method of claim 1, wherein the nucleophilic source comprises $Fe_3O_4$.

30. The method of claim 1, wherein the weight ratio of the nucleophilic source to the porous solid support is 1:1.

\* \* \* \* \*